(12) United States Patent
Kasuya

(10) Patent No.: US 8,761,582 B2
(45) Date of Patent: Jun. 24, 2014

(54) VIDEO EDITING DEVICE AND VIDEO EDITING SYSTEM

(75) Inventor: Yuuji Kasuya, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 105 days.

(21) Appl. No.: 13/256,309

(22) PCT Filed: Mar. 3, 2010

(86) PCT No.: PCT/JP2010/053933
§ 371 (c)(1),
(2), (4) Date: Sep. 13, 2011

(87) PCT Pub. No.: WO2010/104091
PCT Pub. Date: Sep. 16, 2010

(65) Prior Publication Data
US 2012/0014672 A1 Jan. 19, 2012

(30) Foreign Application Priority Data

Mar. 13, 2009 (JP) .................................. 2009-060760
Oct. 29, 2009 (JP) .................................. 2009-249045

(51) Int. Cl.
*H04N 5/93* (2006.01)

(52) U.S. Cl.
USPC ........................................................ 386/281

(58) Field of Classification Search
None
See application file for complete search history.

(56) References Cited

U.S. PATENT DOCUMENTS

| | | | |
|---|---|---|---|
| 6,711,276 | B1 | 3/2004 | Yoshiura et al. |
| 2002/0006163 | A1* | 1/2002 | Hibi et al. ................ 375/240.16 |
| 2003/0234772 | A1* | 12/2003 | Zhang et al. ................ 345/177 |
| 2004/0057600 | A1* | 3/2004 | Niwa ............................ 382/103 |
| 2005/0104864 | A1 | 5/2005 | Zhang et al. |
| 2006/0257042 | A1 | 11/2006 | Ofek et al. |
| 2007/0126755 | A1 | 6/2007 | Zhang et al. |

(Continued)

FOREIGN PATENT DOCUMENTS

| | | |
|---|---|---|
| CN | 1270474 A | 10/2000 |
| CN | 101021904 A | 8/2007 |

(Continued)

OTHER PUBLICATIONS

Dickson et al. "Whiteboard Content Extraction and Analysis for the Classroom Environment" Multimedia, 2008. ISM 2008. Tenth IEEE International Symposium on, pp. 702-707.*

(Continued)

*Primary Examiner* — Thai Tran
*Assistant Examiner* — Stephen Smith
(74) *Attorney, Agent, or Firm* — Oblon, Spivak, McClelland, Maier & Neustadt, L.L.P.

(57) ABSTRACT

A video editing device, which edits a video of an object on which image information is drawn, includes a moving-body-frame detecting unit that detects a frame on which a moving body obstructing the object is captured; a draw-frame identifying unit that identifies a frame at which drawing of the image information is started by comparing a post-detection frame that is an obstructed frame detected by the moving-body-frame detecting unit with each of detection frames that are not-obstructed frames detected by the moving-body-frame detecting unit; and a synthesis processing unit that performs a synthesis process of synthesizing image information included in the post-detection frame onto a frame anterior to the frame identified by the draw-frame identifying unit.

15 Claims, 14 Drawing Sheets

(56) References Cited

U.S. PATENT DOCUMENTS

| | | | |
|---|---|---|---|
| 2007/0156816 A1 | 7/2007 | Zhang et al. | |
| 2007/0269105 A1 | 11/2007 | Zhang et al. | |
| 2009/0153659 A1* | 6/2009 | Landwehr et al. | 348/135 |
| 2009/0309956 A1* | 12/2009 | Hawkins et al. | 348/14.08 |
| 2010/0149349 A1* | 6/2010 | Kroeker et al. | 348/207.1 |

FOREIGN PATENT DOCUMENTS

| | | |
|---|---|---|
| JP | 9-252467 A | 9/1997 |
| JP | 2006 031359 | 2/2006 |
| JP | 2006 162692 | 6/2006 |
| WO | WO 02/25575 A2 | 3/2002 |
| WO | WO 02/25575 A3 | 3/2002 |
| WO | WO 2005/073913 A1 | 8/2005 |

OTHER PUBLICATIONS

Combined Chinese Office Action and Search Report issued Jul. 3, 2013, in Chinese Patent Application No. 2010800115537 with English translation.

Extended European Search Report issued May 29, 2013, in European Patent Application No. 10750844.2.

Li-Wei He, et al., "Real-Time Whiteboard Capture and Processing Using a Video Camera for Remote Collaboration", IEEE Transactions on Multimedia, vol. 9, No. 1, XP-011151796, Jan. 1, 2007, pp. 198-206.

Ichimura, S., et al., "Recording Chalk Talks into a Movie and Still Images," Information Processing Society of Japan (IPSJ) Journal, vol. 47, No. 3, pp. 924-931, (Mar. 2006) (with English translation).

Tachibana, K., et al., "Development of Automatic Digital Content Generation System for Regular Classrooms," The Institute of Electronics, Information and Communication Engineers, IEICE Technical Report, pp. 87-92, (Dec. 2004) (with English translation).

Nishigori, S., et al., "An Automatic Camera Control System for Distance Lecture with Blackboard," The Institute of Electronics, Information and Communication Engineers, IEICE Technical Report, pp. 79-86, (Mar. 2001) (with English translation).

Tamura, H., "Computer Image Processing," OHMSHA, Ltd., pp. 143-150, 2002) (with English translation).

International Search Report issued Apr. 13, 2010 in PCT/JP10/053933 filed Mar. 3, 2010.

* cited by examiner

VIDEO DATA

VIDEO EDITING DEVICE AND VIDEO EDITING SYSTEM

TECHNICAL FIELD

The present invention relates to a video editing device, and more particularly, to a video editing device for editing a video of an object on which image information is drawn and a video editing system including the video editing device.

BACKGROUND ART

Conventionally, there has been known a technology for recording image information drawn on an object, such as a whiteboard or a blackboard used in a meeting, a lecture, and the like, as a video. However, on a simply-shot video of the object, a moving body, such as a person who draws image information on the object, is captured, thus, when the drawn image information is obstructed by the moving body, the visibility of the image information is degraded.

For resolving such degradation of the visibility of the image information, there has been developed a technology for extracting contents written on a blackboard as an object from a blackboard video obtained by recording a video of the blackboard, in such a manner that a content area where addition or deletion of contents is made is periodically being extracted from the blackboard video, and line-detecting the contents from the extracted content area, and then vector data is generated as image information (for example, see Patent document 1: Japanese Patent Application Laid-open No. 2006-162692).

However, in the above conventional technology, the entire range of areas where a lecturer area is moved in a certain period of time is extracted from the blackboard area and held, and an area that the lecturer area of a current frame is removed from the range is set down as a search area to be searched for update information on characters written on the blackboard, thus there is a problem that, for example, if the lecturer area is not moved over a long time, a detection time of characters written on the blackboard, i.e., image information lags significantly behind a time when the image information is actually drawn.

The present invention has been made to solve the above problems, and an object of the present invention is to provide a video editing device capable of suppressing a delay of a detection time with respect to a time when image information is drawn at the time of extracting the image information from a video of an object.

DISCLOSURE OF INVENTION

According to one aspect of the present invention, there is provided a video editing device that edits a video of an object on which image information is drawn, the video editing device including: a moving-body-frame detecting unit that detects a frame on which a moving body obstructing the object is captured; a draw-frame identifying unit that identifies a frame at which drawing of the image information is started by comparing a post-detection frame that is an obstructed frame detected by the moving-body-frame detecting unit with each of detection frames that are not-obstructed frames detected by the moving-body-frame detecting unit; and a synthesis processing unit that performs a synthesis process of synthesizing image information included in the post-detection frame onto a frame anterior to the frame identified by the draw-frame identifying unit.

According to the present invention, by comparing a frame at which the moving body no longer obstructs the object with each of frames at which the moving body obstructs the object, when the image information is extracted from the video of the object, it is thus possible to suppress a gap between a detected time point and a time point when the image information is drawn. Therefore, it is possible to provide a video editing device capable of suppressing a delay of a detection time with respect to a time when image information is drawn at the time of extracting the image information from a video of an object.

Furthermore, according to another aspect of the present invention there is provided a video editing system including: an object on which image information is drawn; a video shooting device that shoots the object; and a video editing device that edits a video shot by the video shooting device, the video editing device including a moving-body-frame detecting unit that detects a frame on which a moving body obstructing the object is captured, a draw-frame identifying unit that identifies a frame at which drawing of the image information is started by comparing a post-detection frame that is an obstructed frame detected by the moving-body-frame detecting unit with each of detection frames that are not-obstructed frames detected by the moving-body-frame detecting unit, and a synthesis processing unit that performs a synthesis process of synthesizing image information included in the post-detection frame onto a frame anterior to the frame identified by the draw-frame identifying unit.

According to the present invention, the video editing device is caused to identify a frame at which drawing of image information is started by comparing a frame at which the moving body no longer obstructs the object with each of frames at which the moving body obstructs the object, thus when the image information is extracted from the video of the object, it is possible to suppress a gap between a detected time point and a time point when the image information is drawn.

BEST MODES FOR CARRYING OUT THE INVENTION

Exemplary embodiments of the present invention are explained below with reference to the accompanying drawings.

First Embodiment

Figure 1:
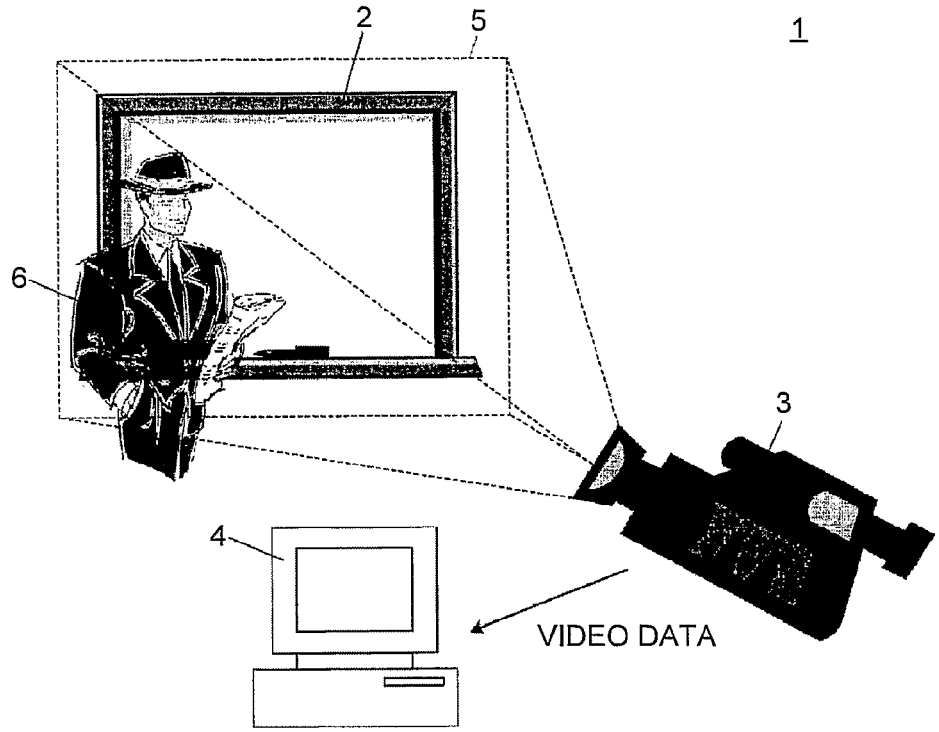
FIG. 1 is a block diagram of a video editing system according to a first embodiment.

As shown in FIG. 1, a video editing system 1 according to a first embodiment of the present invention includes a whiteboard 2 as an object, a video shooting device 3 that shoots an area including the whiteboard 2, and a video editing device 4 that edits a video shot by the video shooting device 3.

In the present embodiment, an example where the whiteboard 2 is used as an object is explained; however, in the present invention, a blackboard, a projection screen, paper, and the like can be used as an object.

The video shooting device 3 is composed of a commonly-used video camera, and the video camera can be either the one that records a shot video on a storage medium, such as a magnetic disk, a magnetic tape, an optical disk, and a non-volatile memory, or the one that converts a shot video into an electrical signal, a radio signal, or an optical signal and outputs the signal to an external device such as the video editing device 4. The video shooting device 3 is fixed with respect to the whiteboard 2 so that an area including the whiteboard 2 can be a shooting range 5.

Figure 2:
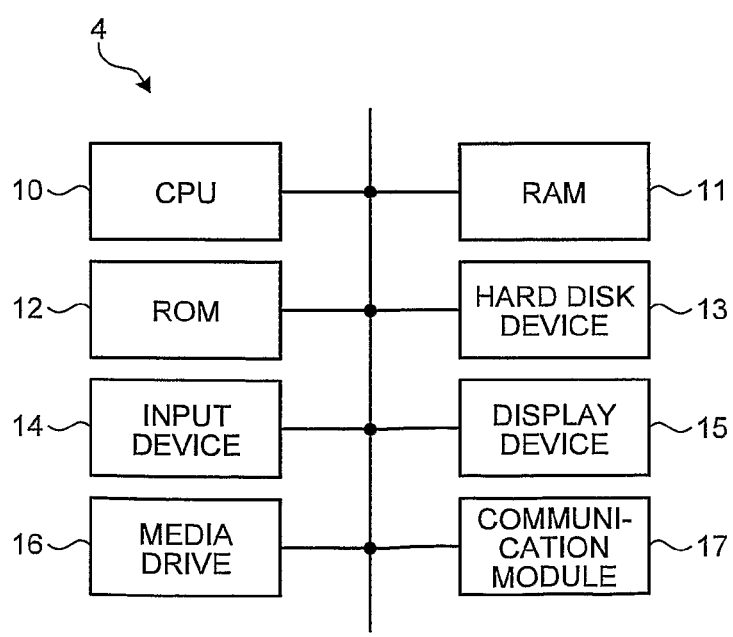
FIG. 2 is a hardware configuration diagram of a video editing device according to the first embodiment.

The video editing device 4 is, as shown in FIG. 2, composed of a commonly-used computer device including a CPU (Central Processing Unit) 10, a RAM (Random Access Memory) 11, a ROM (Read Only Memory) 12, a hard disk device 13, an input device 14 composed of a keyboard, a pointing device, and the like, a display device 15 composed of a liquid crystal display and the like, a media drive 16 that performs read/write of data to media, such as an optical disk and a nonvolatile memory, and a communication module 17 for establishing communication with an external device.

In the hard disk device 13, a program causing the computer device to serve as the video editing device 4 is stored. Video data representing the video shot by the video shooting device 3 is input to the video editing device 4 via the media drive 16 or the communication module 17.

In the present embodiment, it is explained that the video data input to the video editing device 4 via the media drive 16 or the communication module 17 shall be stored in the hard disk device 13.

Figure 3:
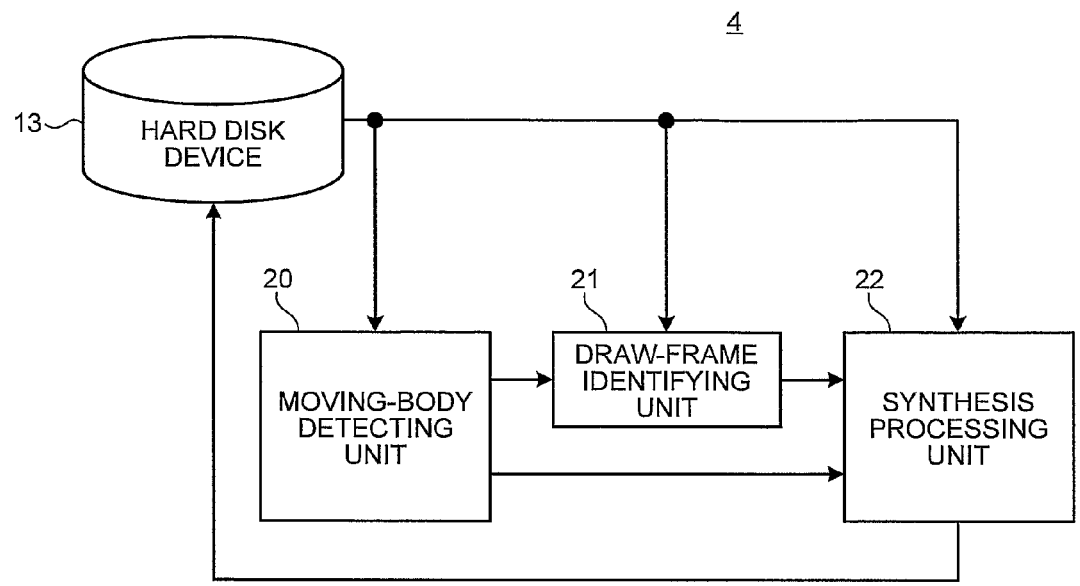
FIG. 3 is a functional block diagram of the video editing device according to the first embodiment.

By executing the program stored in the hard disk device 13 with the RAM 11 as a work area, as shown in FIG. 3, the CPU 10 serves as a moving-body detecting unit 20 that detects a frame on which a moving body 6, such as a person who obstructs the whiteboard 2 (see FIG. 1), is captured from the video represented by the video data stored in the hard disk device 13; a draw-frame identifying unit 21 that identifies a frame at which drawing of image information onto the whiteboard 2 is started; and a synthesis processing unit 22 that synthesizes the image information among frames to remove the moving body 6 from the video.

The moving-body detecting unit 20 is configured to detect a frame on which the moving body 6 obstructing the whiteboard 2 is captured based on a change in a detection area circumscribed by at least one side, including the base, of the whiteboard 2 in the video.

Figure 4:
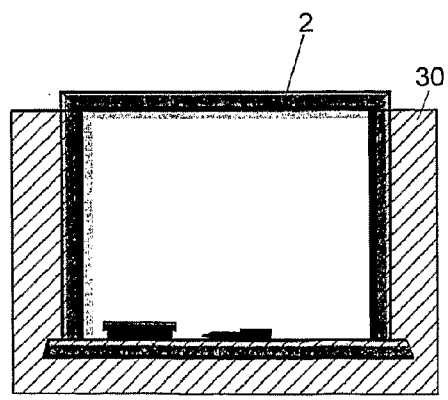
FIG. 4 is a first conceptual diagram for explaining a detection area by a moving-body detecting unit composing the video editing device according to the first embodiment.

Incidentally, in the present embodiment, the moving-body detecting unit 20 shall detect a frame on which the moving body 6 obstructing the whiteboard 2 is captured based on a change in a detection area 30 circumscribed by the base and both sides of the whiteboard 2 in the video as shown in FIG. 4; alternatively, it can be configured that the detection area 30 is set with the input device 14.

Specifically, the moving-body detecting unit 20 calculates a difference in image of the detection area 30 between an initial frame and each of other frames with a frame on which the moving body 6 obstructing the whiteboard 2 is not captured, the initial frame being such as the first frame in the video, and detects a frame on which the moving body 6 obstructing the whiteboard 2 is captured based on the calculated difference.

In the present embodiment, the term "difference in image" here means an absolute value of a difference in brightness or a distance scale in a color space, and the moving-body detecting unit 20 divides the detection area 30 into cells of a predetermined size, and if there is any cell of which the difference among the frames is bigger than a predetermined threshold TH1, determines that a frame on which the moving body 6 obstructing the whiteboard 2 is captured is detected.

Figure 5:
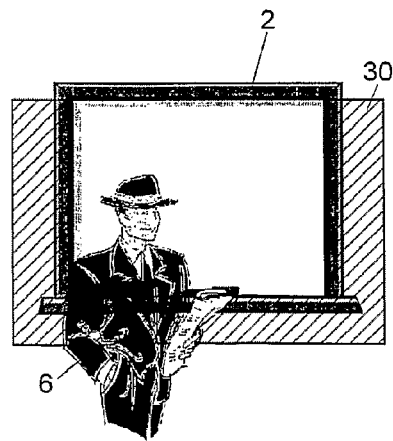
FIG. 5 is a second conceptual diagram for explaining the detection area of the moving-body detecting unit composing the video editing device according to the first embodiment.
Figure 6:
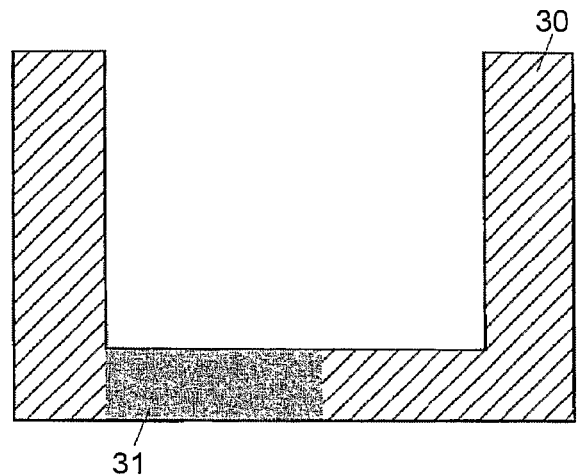
FIG. 6 is a third conceptual diagram for explaining the detection area of the moving-body detecting unit composing the video editing device according to the first embodiment.

For example, when the moving body 6 exists in front of the whiteboard 2 as shown in FIG. 5, a cluster of cells 31 of which the difference among the frames is bigger than the predetermined threshold TH1 is detected as shown in FIG. 6, and the moving-body detecting unit 20 determines that a frame on which the moving body 6 obstructing the whiteboard 2 is captured is detected.

Alternatively, the moving-body detecting unit 20 can be configured to detect a frame on which the moving body 6 obstructing the whiteboard 2 is captured based on whether the sum of lengths of motion vectors in the video exceeds a predetermined threshold or to detect a frame on which the moving body 6 obstructing the whiteboard 2 is captured by a combination of the detection based on a change in the detection area 30 and the extraction of motion vectors. Furthermore, the moving-body detecting unit 20 can be composed of a switch that is switched over before and after the moving body 6 obstructs the whiteboard 2.

The draw-frame identifying unit 21 is configured to binarize frames detected by the moving-body detecting unit 20 (hereinafter, each referred to as a "detection frame"), a frame immediately anterior to a section of the detection frames (hereinafter, referred to as simply a "pre-detection frame"), and a frame immediately posterior to the section (hereinafter, referred to as simply a "post-detection frame").

Furthermore, the draw-frame identifying unit 21 is configured to generate a difference image by XORing the binarized pre-detection frame with the binarized post-detection frame. At this time, it is preferable that the draw-frame identifying unit 21 clips the difference image within a range of which a drawing area of the whiteboard 2 is captured thereon.

Instead of generating a difference image by XORing the binarized pre-detection frame with the binarized post-detection frame, the draw-frame identifying unit 21 can be configured to generate a difference image composed of a difference in brightness between the pre-detection frame and the post-detection frame.

Furthermore, the draw-frame identifying unit 21 is configured to extract a circumscribed rectangle of a connected component of black pixels (a connected component of pixels having the brightness of a certain value or less if the difference image is composed of a difference in brightness) from the difference image. For example, the draw-frame identifying unit 21 scans the difference image, connects black pixels by labeling the black pixels, and extracts a smallest rectangle containing pixels with the same label as a circumscribed rectangle. Incidentally, the connection of pixels by the draw-frame identifying unit 21 is a well-known technique, thus an explanation about this is omitted (for example, see Non-patent document 1: Hideyuki Tamura, Computer Image Processing, pp 143-150, Ohmsha, Ltd., 2002).

The draw-frame identifying unit 21 determines whether an area corresponding to the circumscribed rectangle in the binarized post-detection frame matches an area corresponding to the circumscribed rectangle in any of the binarized detection frames, and if the area in the binarized post-detection frame matches the area in any of the binarized detection frames, more specifically, if a result of the matching exceeds a predetermined threshold TH2, identifies the frame as an update frame of the circumscribed rectangle.

Incidentally, an area corresponding to the circumscribed rectangle in each of the detection frames means an area identical to the circumscribed rectangle in the post-detection frame in each of the detection frames or a surrounding area within a predetermined margin of error with respect to the identical area.

The synthesis processing unit 22 replaces each detection frame with a frame immediately anterior to the detection frame for each section of frames detected by the moving-body detecting unit 20, and if the detection frame is identified as an update frame of any circumscribed rectangle by the draw-frame identifying unit 21, superimposes an area corresponding to the circumscribed rectangle in the post-detection frame onto the corresponding area in the detection frame.

By performing such a process sequentially, the synthesis processing unit 22 generates a video from which an image of the moving body 6 is removed, and records video data representing the generated video on the hard disk device 13.

Incidentally, it is preferable that the synthesis processing unit 22 performs the process described above after the brightness of detection frames is averaged for each section of frames detected by the moving-body detecting unit 20 so that if the brightness changes due to a change in shooting environment, a characteristic change of the video shooting device, and the like while the moving body 6 obstructs the whiteboard 2, the synthesis processing unit 22 can generate a synthetic video that is not affected by these changes.

An operation of the video editing device 4 configured as described above is explained with reference to FIGS. 7 to 10.

Figure 7:
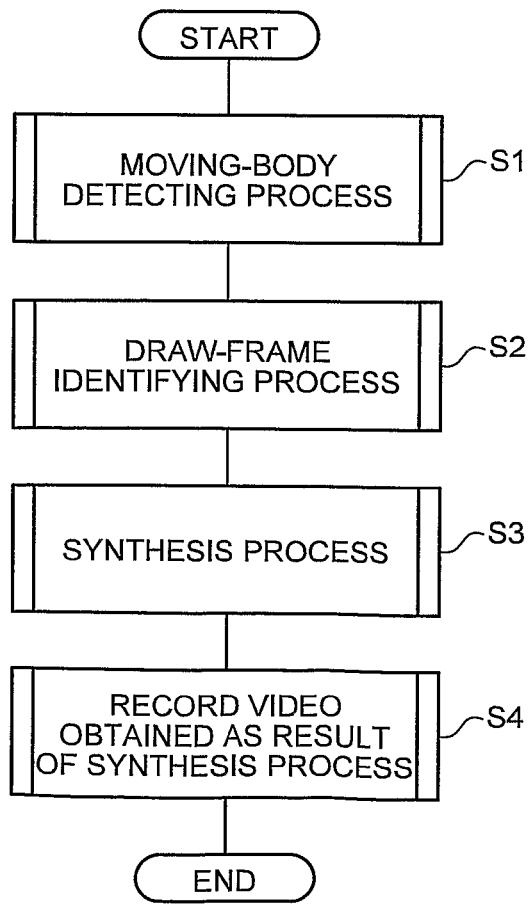
FIG. 7 is a flowchart for explaining an operation of the video editing device according to the first embodiment.

As shown in FIG. 7, the video editing device 4 first causes the moving-body detecting unit 20 to perform a moving-body detecting process on video data selected from video data stored in the hard disk device 13 through the input device 14 (Step S1), then causes the draw-frame identifying unit 21 to perform a draw-frame identifying process (Step S2), at last causes the synthesis processing unit 22 to perform a synthesis process (Step S3), and records video data representing a video obtained as a result of the synthesis process on the hard disk device 13 (Step S4).

Figure 8:
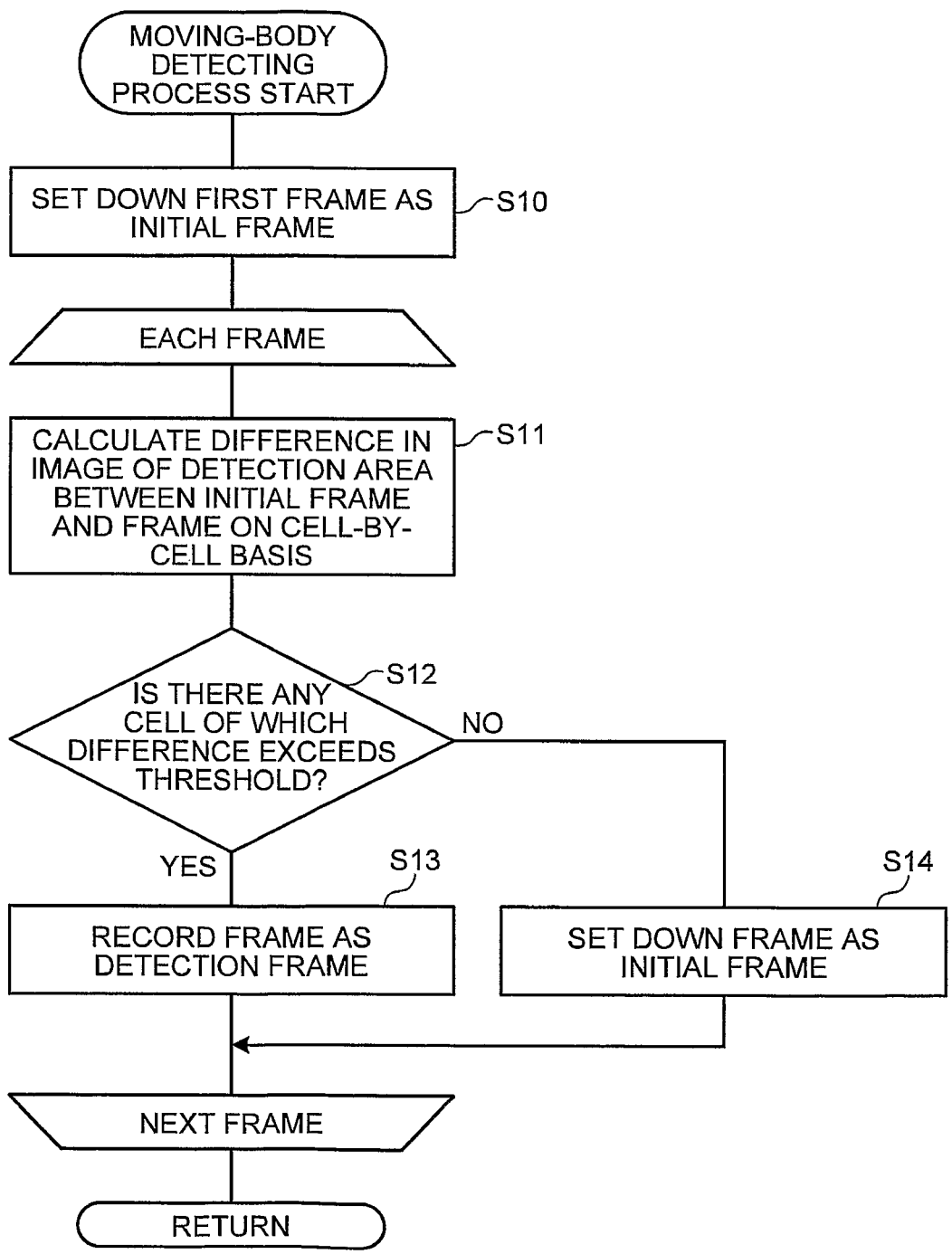
FIG. 8 is a flowchart for explaining a moving-body detecting process of the video editing device according to the first embodiment.

As shown in FIG. 8, in the moving-body detecting process, first, the first frame in the video is set down as an initial frame (Step S10), and Steps S11 to S14 to be explained below are performed on each frame other than the initial frame.

First, the moving-body detecting unit 20 calculates a difference in image of the detection area 30 between the initial frame and the frame on a cell-by-cell basis (Step S11). Then, the moving-body detecting unit 20 determines whether there is any cell of which the calculated difference exceeds the threshold TH1 (Step S12).

If it is determined that there is a cell of which the difference exceeds the threshold TH1, the moving-body detecting unit 20 determines that a frame on which the moving body 6 obstructing the whiteboard 2 is captured is detected, and the frame is set down as a detection frame, and a frame number of the frame is recorded on a RAM or the like (Step S13), and the processes with respect to the next frame are performed.

On the other hand, if it is determined that there is no cell of which the difference exceeds the threshold TH1, the moving-body detecting unit 20 determines that a frame on which the moving body 6 obstructing the whiteboard 2 is captured is not detected, and sets down the frame as an initial frame (Step S14), the processes with respect to the next frame are performed.

Figure 9:
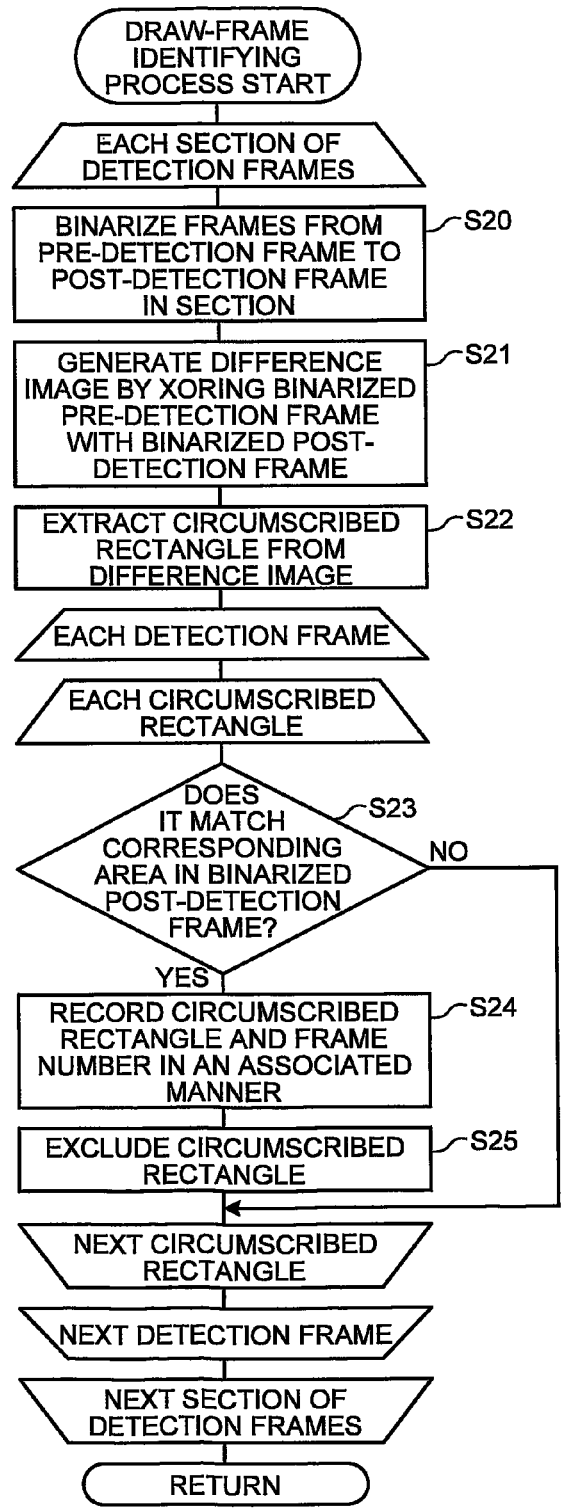
FIG. 9 is a flowchart for explaining a draw-frame identifying process of the video editing device according to the first embodiment.

As shown in FIG. 9, in the draw-frame identifying process, Steps S20 to S25 to be explained below are performed on each section of detection frames detected by the moving-body detecting unit 20.

First, the draw-frame identifying unit 21 binarizes frames from a pre-detection frame to a post-detection frame in the section (Step S20). Then, the draw-frame identifying unit 21 generates a difference image by XORing the binarized pre-detection frame with the binarized post-detection frame (Step S21), and extracts a circumscribed rectangle from the difference image (Step S22).

Steps S23 to S25 to be explained below are performed on each of the detection frames for each extracted circumscribed rectangle.

First, the draw-frame identifying unit 21 determines whether an area corresponding to the circumscribed rectangle in the binarized post-detection frame matches an area corresponding to the circumscribed rectangle in the binarized detection frame (Step S23).

If the corresponding area in the binarized post-detection frame matches the corresponding area in the binarized detection frame, the draw-frame identifying unit 21 records a frame number of the detection frame and the circumscribed rectangle on the RAM or the like in an associated manner (Step S24), and the circumscribed rectangle is excluded as the circumscribed rectangle extracted from the difference image (Step S25).

On the other hand, if the corresponding area in the binarized post-detection frame does not match the corresponding area in the binarized detection frame, or after the circumscribed rectangle has been excluded, the processes with respect to the next circumscribed rectangle or the next detection frame are performed.

Figure 10:
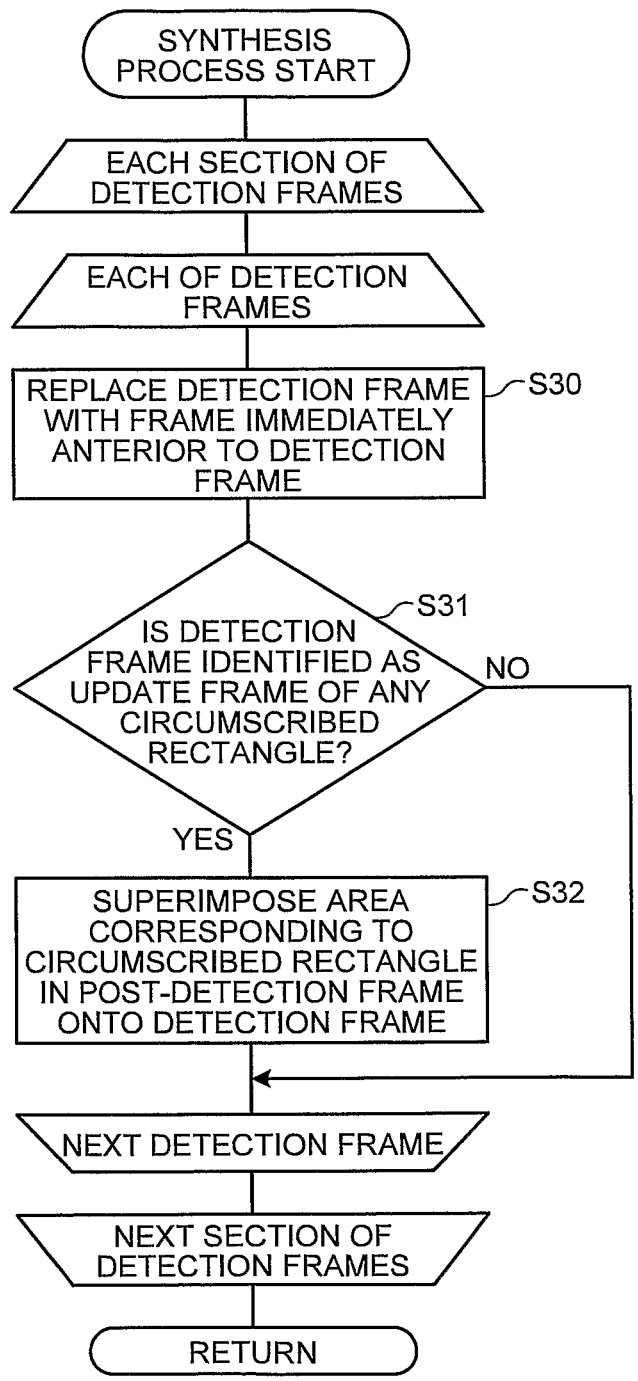
FIG. 10 is a flowchart for explaining a synthesis process of the video editing device according to the first embodiment.

As shown in FIG. 10, in the synthesis process, Steps S30 to S32 to be explained below are performed on each of detection frames in each section of detection frames detected by the moving-body detecting unit 20.

First, the synthesis processing unit 22 replaces the detection frame with a frame immediately anterior to the detection frame (Step S30). Then, the synthesis processing unit 22 determines whether the detection frame is identified as an update frame of any circumscribed rectangle by the draw-frame identifying unit 21, more specifically, whether a frame number of the frame is recorded on the RAM or the like in association with the circumscribed rectangle (Step S31).

If the detection frame is identified as an update frame of any circumscribed rectangle, an area corresponding to the circumscribed rectangle in the post-detection frame is superimposed onto the corresponding area in the detection frame (Step S32). On the other hand, if the detection frame is not identified as an update frame of any circumscribed rectangle, the processes with respect to the next detection frame are performed.

Figure 11:
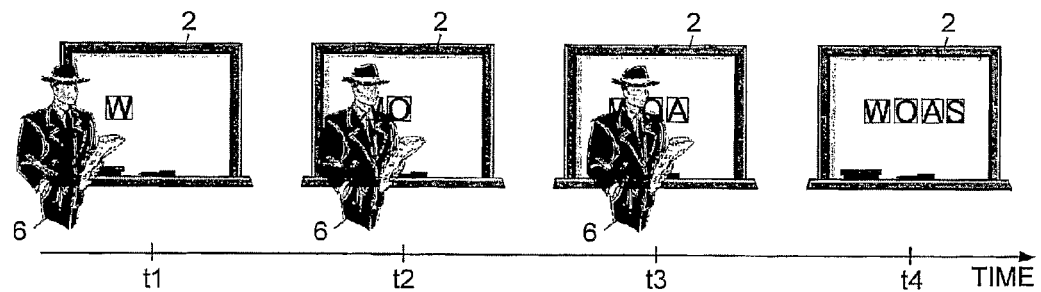
FIG. 11 is a conceptual diagram for explaining the operation of the video editing device according to the first embodiment.

For example, as shown in FIG. 11, when a frame at a time t4 is detected as a post-detection frame through the operation of the video editing device 4 as described above, writing of "W" is detected in a frame at a time t1, writing of "O" is detected in a frame at a time t2, and writing of "A" is detected in a frame at a time t3.

Even if the writing of "W" is obstructed by the moving body 6 at the time t2, the writing of "W" is recorded based on the frame at the time t1, thus the writing of "W" is synthesized based on the frame at the time t1.

Similarly, even if the writing of "O" is obstructed by the moving body 6 at the time t3, the writing of "O" is recorded based on the frame at the time t2, thus the writing of "O" is synthesized based on the frame at the time t2.

As explained above, the video editing system 1 according to the first embodiment of the present invention causes the video editing device 4 to identify a frame at which drawing of image information is started by comparing a subsequent frame of the last frame at which the moving body 6 obstructs the whiteboard 2 with each of frames at which the moving body 6 obstructs the whiteboard 2, thus when image information is extracted from a video of the whiteboard 2, it is possible to suppress gap between a detected time point and a time point when the image information is drawn.

Figure 12:
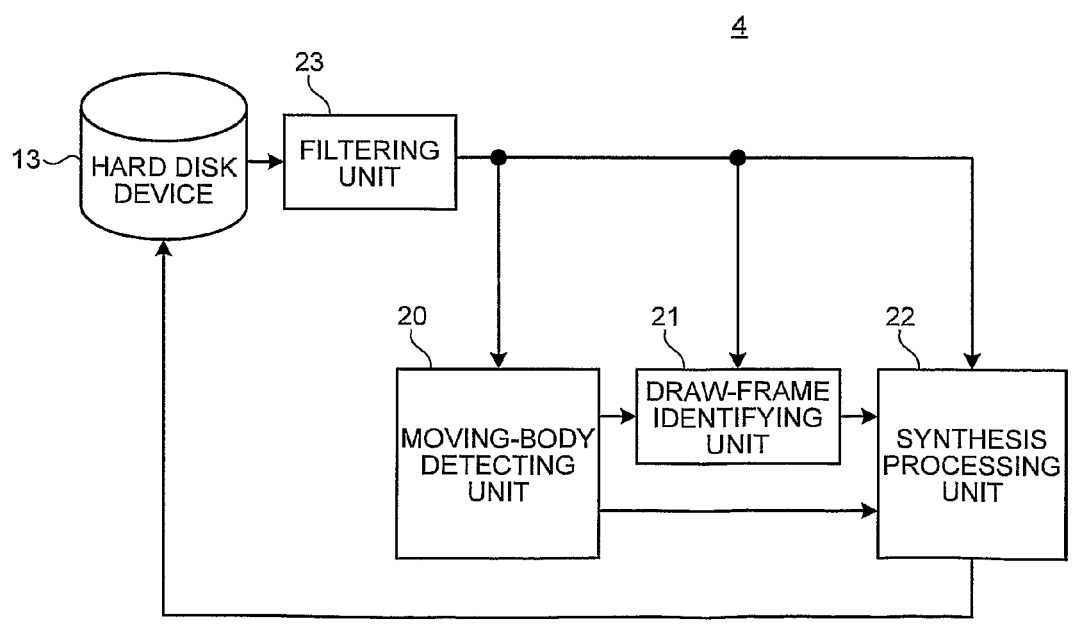
FIG. 12 is a functional block diagram of another form of the video editing device according to the first embodiment.

Incidentally, in the present invention, the video editing system 1 can be configured to include, as shown in FIG. 12, a filtering unit 23 that adds, with respect to each pixel composing each frame of a video to be edited, a certain background color predetermined according to a difference value between an average value of the brightness of a predetermined area centering around the pixel and the brightness of the pixel.

For example, as in the present embodiment, when the whiteboard 2 is used as an object on which image information is drawn, the image information drawn on the whiteboard 2 decreases in brightness with respect to a drawing area, thus the filtering unit 23 subtracts an average value of the brightness of a predetermined area centering around each pixel (for example, about 10 to 200 pixels×10 to 200 pixels) from the brightness of the pixel, and clips the brightness of pixels of which the result of subtraction exceeds 0 to 0, and then adds a certain background color (for example, [R, G, B]=[100 to 255, 100 to 255, 100 to 255]) to the result.

Consequently, the video editing system 1 can remove an environment light falling on the whiteboard 2 from a video of the whiteboard 2 so as to achieve a white balance of the video of the whiteboard 2 can be achieved.

Second Embodiment

A second embodiment of the present invention is achieved by changing the program executed by the CPU 10 of the video editing device 4 in the first embodiment of the present invention, and function blocks are specified in the same manner as the first embodiment, thus the second embodiment of the present invention is explained by using the video editing system 1 shown in FIG. 1.

In the first embodiment of the present invention, it is explained that the draw-frame identifying unit 21 extracts a circumscribed rectangle from a difference image. In the present embodiment, the draw-frame identifying unit 21 is configured to divide a difference image into cells of a relatively-large predetermined size (for example, 5 pixels×5 pixels or larger).

Furthermore, in the present embodiment, the draw-frame identifying unit 21 determines whether a corresponding area in a binarized post-detection frame matches a corresponding area in each of binarized detection frames for each cell containing black pixel(s) in the difference image, and if the corresponding area in the binarized post-detection frame matches the corresponding area in any of the binarized detection frames, identifies the frame as an update frame of the cell.

Moreover, in the first embodiment of the present invention, it is explained that the synthesis processing unit 22 replaces each detection frame with a frame immediately anterior to the detection frame for each section of frames detected by the moving-body detecting unit 20, and if the detection frame is identified as an update frame of any circumscribed rectangle by the draw-frame identifying unit 21, superimposes an area corresponding to the circumscribed rectangle in the post-detection frame onto the corresponding area in the detection frame.

In the present embodiment, the synthesis processing unit 22 replaces each detection frame with a frame immediately anterior to the detection frame for each section of frames detected by the moving-body detecting unit 20, and if the detection frame is identified as an update frame of any cell by the draw-frame identifying unit 21, superimposes an area of the cell in the post-detection frame onto the corresponding area in the detection frame.

An operation of the video editing device 4 configured as described above is explained with reference to FIGS. 13 and 14. Incidentally, the operation of the video editing device 4 in the present embodiment differs from the operation of the video editing device 4 in the first embodiment of the present invention in the moving-body detecting process and the synthesis process only, thus these processes are explained.

Figure 13:
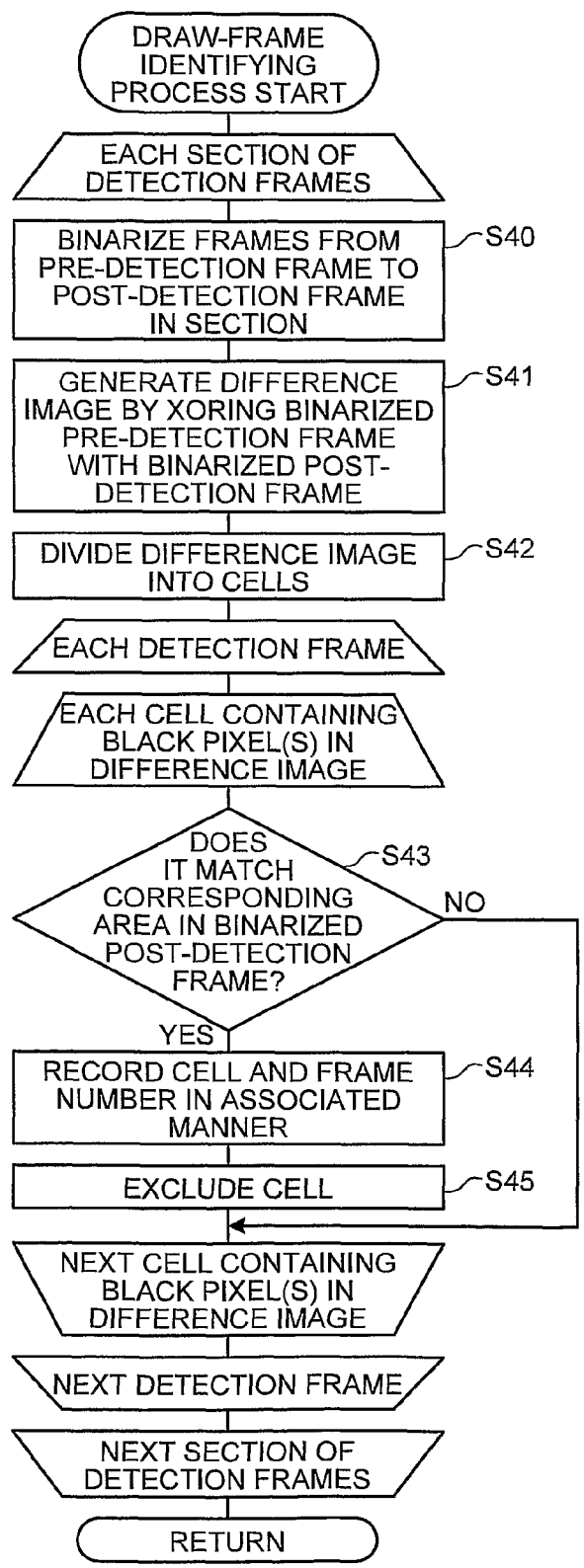
FIG. 13 is a flowchart for explaining a draw-frame identifying process of a video editing device according to a second embodiment.

As shown in FIG. 13, in the draw-frame identifying process, Steps S40 to S45 to be explained below are performed on each section of detection frames detected by the moving-body detecting unit 20.

First, the draw-frame identifying unit 21 binarizes frames from a pre-detection frame to a post-detection frame of a section (Step S40). Then, the draw-frame identifying unit 21 generates a difference image by XORing the binarized pre-detection frame with the binarized post-detection frame (Step S41), and divides the difference image into a plurality of cells (Step S42).

Steps S43 to S45 to be explained below are performed on each of the detection frames for each cell containing black pixel(s) in the difference image.

First, the draw-frame identifying unit 21 determines whether an area corresponding to the cell in the binarized post-detection frame matches an area corresponding to the cell in the binarized detection frame (Step S43).

If the corresponding area in the binarized post-detection frame matches the corresponding area in the binarized detection frame, the draw-frame identifying unit 21 records a frame number of the detection frame and the cell on the RAM or the like in an associated manner (Step S44), and the cell is excluded from the difference image (Step S45).

On the other hand, if the corresponding area in the binarized post-detection frame does not match the corresponding area in the binarized detection frame, or after the cell has been excluded, the processes with respect to the next cell or the next detection frame are performed.

Figure 14:
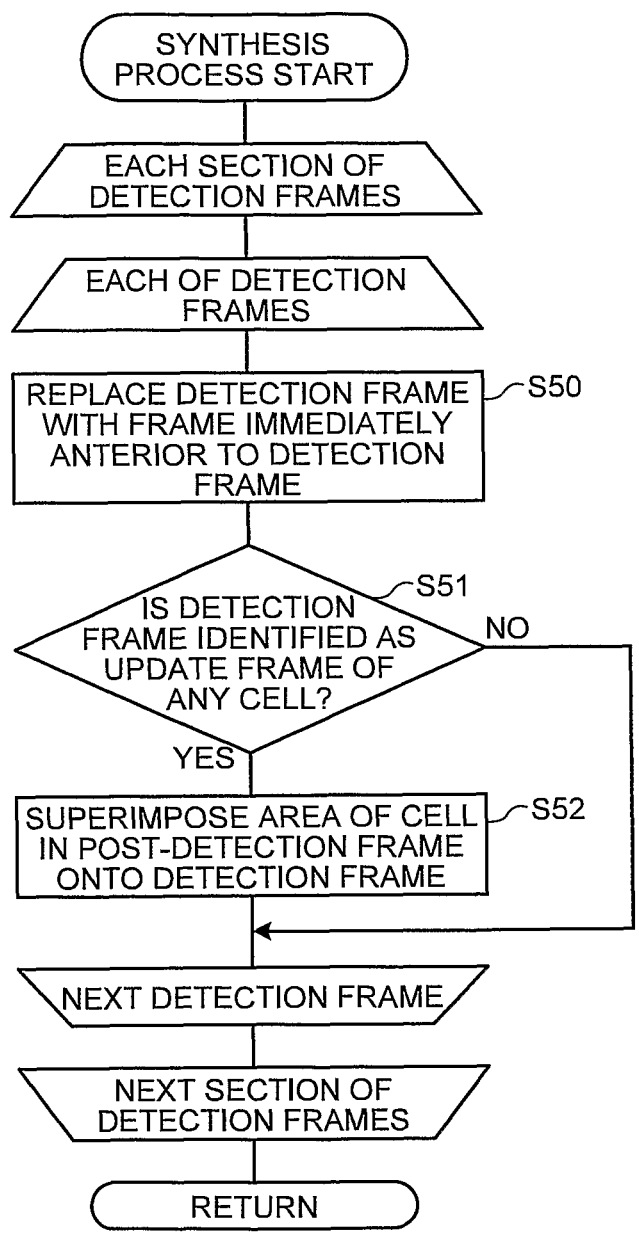
FIG. 14 is a flowchart for explaining a synthesis process of the video editing device according to the second embodiment.

As shown in FIG. 14, in the synthesis process, Steps S50 to S52 to be explained below are performed on each of detection frames in each section of detection frames detected by the moving-body detecting unit 20.

First, the synthesis processing unit 22 replaces the detection frame with a frame immediately anterior to the detection frame (Step S50). Then, the synthesis processing unit 22 determines whether the detection frame is identified as an update frame of any cell by the draw-frame identifying unit 21, more specifically, whether a frame number of the frame is recorded on the RAM or the like in association with the cell (Step S51).

If the detection frame is identified as an update frame of any cell, an area corresponding to the cell in the post-detection frame is superimposed onto the corresponding area in the detection frame (Step S52). On the other hand, if the detection frame is not identified as an update frame of any cell, the processes with respect to the next detection frame are performed.

As explained above, in the same manner as the video editing system 1 according to the first embodiment of the present invention, the video editing system 1 according to the second embodiment of the present invention causes the video editing device 4 to identify a frame at which drawing of image information is started by comparing a subsequent frame of the last frame at which the moving body 6 obstructs the whiteboard 2 with each of frames at which the moving body 6 obstructs the whiteboard 2. Thus, when image information is extracted from a video of the whiteboard 2, it is possible to suppress gap between a detected time point and a time point when the image information is drawn.

Third Embodiment

A third embodiment of the present invention is achieved by changing the program executed by the CPU 10 of the video editing device 4 in the first and second embodiments of the present invention, and function blocks are specified in the same manner as the first embodiment, thus the third embodiment of the present invention is explained by using the video editing system 1 shown in FIG. 1.

In the second embodiment of the present invention, it is explained that the draw-frame identifying unit 21 divides a difference image into cells of a relatively-large predetermined size. In the present embodiment, the draw-frame identifying unit 21 is configured to divide a difference image into cells of a relatively-small predetermined size (for example, smaller than 5 pixels×5 pixels). Incidentally, the size of these cells can be 1 pixel×1 pixel.

Furthermore, in the present embodiment, the draw-frame identifying unit 21 determines whether a corresponding area in a binarized post-detection frame matches a corresponding area in each of binarized detection frames for each cell containing black pixel(s) in the difference image, and if the corresponding area in the binarized post-detection frame matches the corresponding area in any of the binarized detection frames, identifies the frame as an update frame of the cell.

However, if the corresponding area in the binarized post-detection frame is not to match a corresponding area in the subsequent frame of the matched frame, the draw-frame identifying unit 21 eliminates the frame as the update frame of the cell.

In the same manner as in the second embodiment of the present invention, the synthesis processing unit 22 replaces each detection frame with a frame immediately anterior to the detection frame for each section of frames detected by the moving-body detecting unit 20, and if the detection frame is identified as an update frame of any cell by the draw-frame identifying unit 21, superimposes an area of the cell in the post-detection frame onto the corresponding area in the detection frame.

An operation of the video editing device 4 configured as described above is explained with reference to FIG. 15. Incidentally, the operation of the video editing device 4 in the present embodiment differs from the operation of the video editing device 4 in the second embodiment of the present invention in the draw-frame identifying process only, thus this process is explained.

Figure 15:
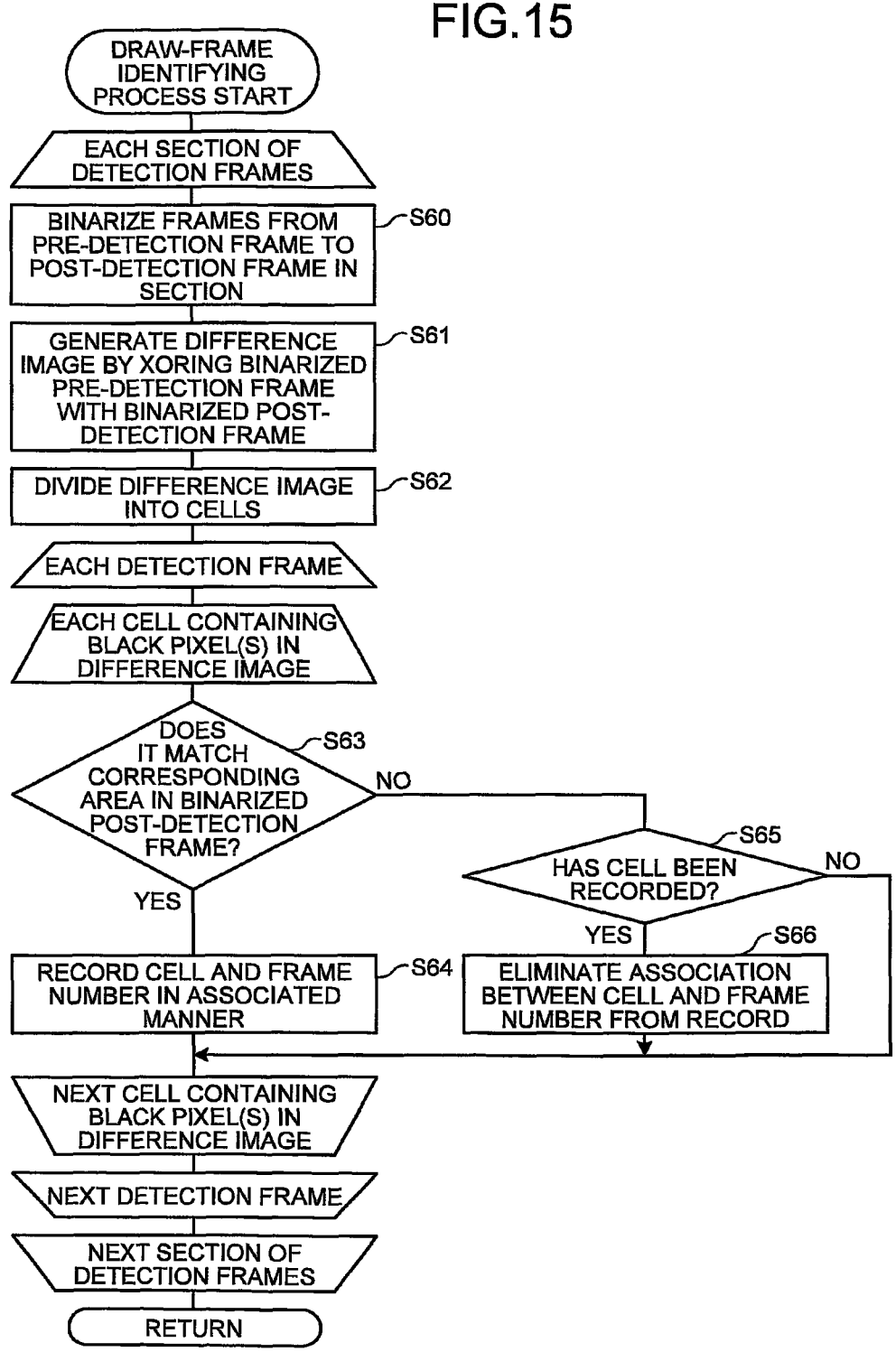
FIG. 15 is a flowchart for explaining a draw-frame identifying process of a video editing device according to a third embodiment.

As shown in FIG. 15, in the draw-frame identifying process, Steps S60 to S66 to be explained below are performed on each section of detection frames detected by the moving-body detecting unit 20.

First, the draw-frame identifying unit 21 binarizes frames from a pre-detection frame to a post-detection frame of the section (Step S60). Then, the draw-frame identifying unit 21 generates a difference image by XORing the binarized pre-detection frame with the binarized post-detection frame (Step S61), and divides the difference image into a plurality of cells (Step S62).

Steps S63 to S66 to be explained below are performed on each of the detection frames for each cell containing black pixel(s) in the difference image.

First, the draw-frame identifying unit 21 determines whether an area corresponding to the cell in the binarized post-detection frame matches an area corresponding to the cell in the binarized detection frame (Step S63).

If the corresponding area in the binarized post-detection frame matches the corresponding area in the binarized detection frame, the draw-frame identifying unit 21 records a frame number of the detection frame and the cell on a recording medium such as a RAM in an associated manner (if it is not recorded) (Step S64), and the processes with respect to the next cell or the next detection frame are performed.

On the other hand, if the corresponding area in the binarized post-detection frame does not match the corresponding area in the binarized detection frame, the draw-frame identifying unit 21 determines whether a frame number of the detection frame and the cell are recorded on the recording medium in an associated manner (Step S65).

If it is determined that the cell is recorded on the recording medium in association with a frame number of the detection frame, the association between the frame number of the detection frame and the cell is eliminated from the recording medium (Step S66).

On the other hand, if it is determined that the cell is not recorded on the recording medium in association with a frame number of the detection frame, or after the association between the frame number of the detection frame and the cell has been eliminated from the recording medium, the processes with respect to the next cell or the next detection frame are performed.

Figure 16:
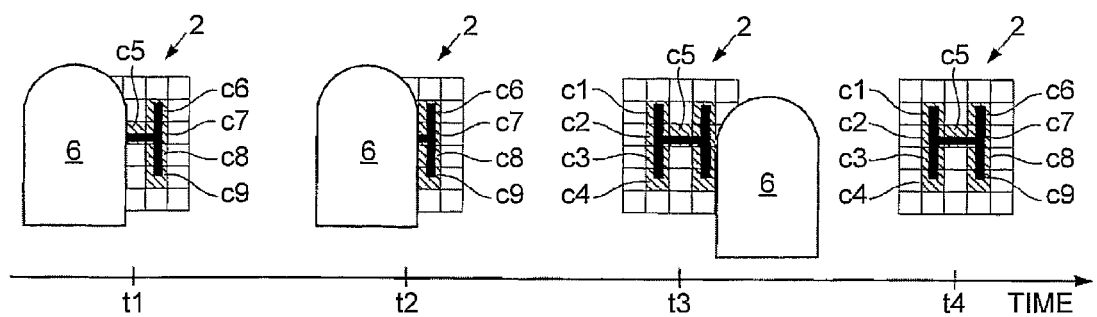
FIG. 16 is a conceptual diagram for explaining an operation of the video editing device according to the third embodiment.

For example, as shown in FIG. 16 in which a portion of the enlarged whiteboard 2 is illustrated, when a frame at a time t4 is detected as a post-detection frame through the operation of the video editing device 4 as described above, writing on cells c5 to c9 is detected in a frame at a time t1, and the writing on the cells c5 to c9 in the frame at the time t1 is recorded.

Then, when the writing on the cell c5 is not detected in a frame at a time t2 in accordance with the movement of the moving body 6, the writing on the cell c5 in the frame at the time t1 is eliminated from the record. The moving body 6 further moves, and the writing on the cells c5 to c9 is detected in a frame at a time t3, and then the writing on the cells c5 to c9 in the frame at the time t3 is recorded.

Therefore, the cells c6 to c9 are synthesized based on the frame at the time t1, and the cells c1 to c5 are synthesized based on the frame at the time t3.

As explained above, the video editing system 1 according to the third embodiment of the present invention can detect a time when drawing of image information is started with high accuracy by comparing frames for each cell of a relatively-small size.

Fourth Embodiment

A fourth embodiment of the present invention is achieved by changing the program executed by the CPU 10 of the video editing device 4 in the first to third embodiments of the present invention, and function blocks are specified in the same manner as the first embodiment, thus the fourth embodiment of the present invention is explained by using the video editing system 1 shown in FIG. 1.

In the first embodiment of the present invention, it is explained that the draw-frame identifying unit 21 extracts a circumscribed rectangle from a difference image. In the present embodiment, the draw-frame identifying unit 21 then divides the extracted circumscribed rectangle into cells of a relatively-small predetermined size (for example, 5 pixels×5 pixels or smaller). Incidentally, the size of these cells can be 1 pixel×1 pixel.

Furthermore, in the present embodiment, the draw-frame identifying unit 21 determines whether a corresponding area in a binarized post-detection frame matches a corresponding area in each of binarized detection frames in units of the circumscribed rectangle in the difference image, and if the corresponding area in the binarized post-detection frame matches the corresponding area in any of the binarized detection frames, identifies the frame as an update frame of the circumscribed rectangle.

Moreover, the draw-frame identifying unit 21 determines whether a corresponding area in the update frame of the circumscribed rectangle matches a corresponding area in each of the binarized detection frames for each cell composing the circumscribed rectangle of the identified frame, and if the corresponding area in the update frame matches the corresponding area in any of the binarized detection frames, identifies the frame as an update frame of the cell.

However, if the corresponding area in the update frame does not match a corresponding area in the subsequent frame of the matched frame, the draw-frame identifying unit 21 eliminates the frame from the update frame of the cell.

In the same manner as in the second embodiment of the present invention, the synthesis processing unit 22 replaces each detection frame with a frame immediately anterior to the detection frame for each section of frames detected by the moving-body detecting unit 20, and if the detection frame is identified as an update frame of any cell by the draw-frame identifying unit 21, superimposes an area of the cell in the post-detection frame onto the corresponding area in the detection frame.

An operation of the video editing device 4 configured as described above is explained with reference to FIGS. 17 and 18. Incidentally, the operation of the video editing device 4 in the present embodiment differs from the operation of the video editing device 4 in the second embodiment of the present invention in the draw-frame identifying process only, thus this process is explained.

Figure 17:
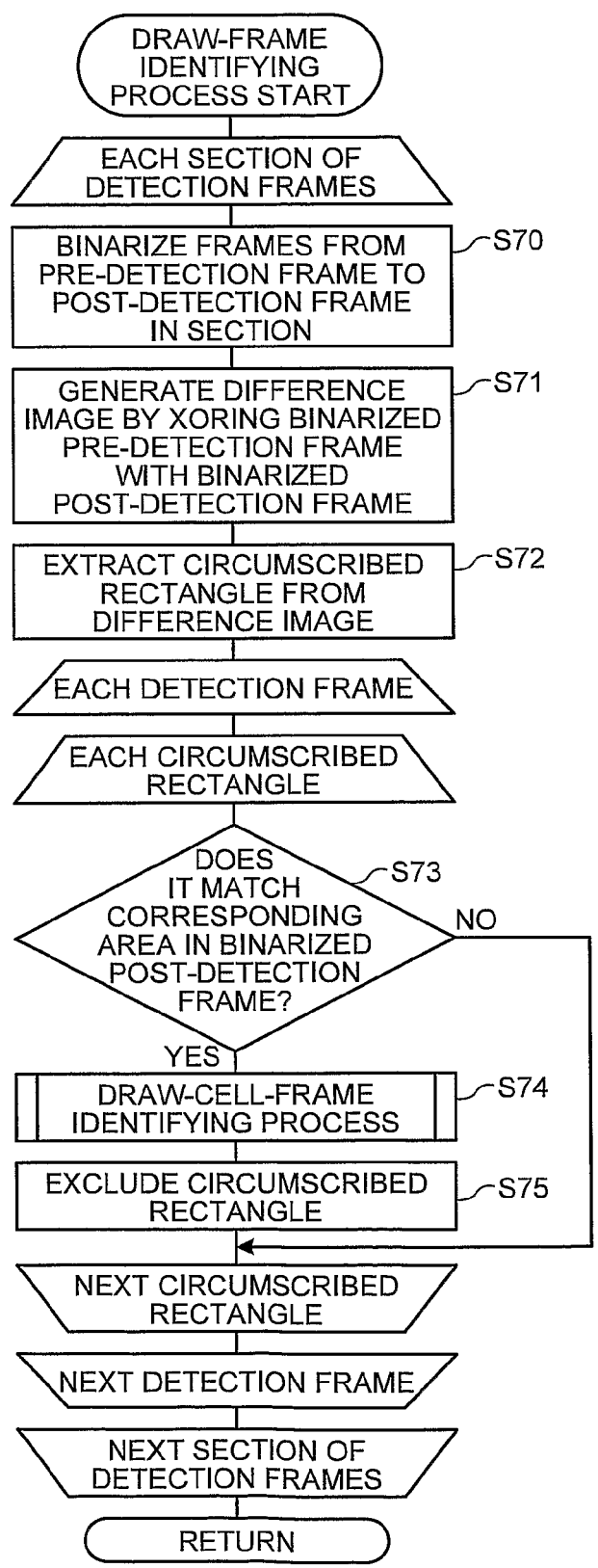
FIG. 17 is a flowchart for explaining a draw-frame identifying process of a video editing device according to a fourth embodiment.

As shown in FIG. 17, in the draw-frame identifying process, Steps S70 to S75 to be explained below are performed on each section of detection frames detected by the moving-body detecting unit 20.

First, the draw-frame identifying unit 21 binarizes frames from a pre-detection frame to a post-detection frame of a section (Step S70). Then, the draw-frame identifying unit 21 generates a difference image by XORing the binarized pre-detection frame with the binarized post-detection frame (Step S71), and extracts a circumscribed rectangle from the difference image (Step S72).

Steps S73 to S75 to be explained below are performed on each of the detection frames for each extracted circumscribed rectangle.

First, the draw-frame identifying unit 21 determines whether an area corresponding to the circumscribed rectangle in the binarized post-detection frame matches an area corresponding to the circumscribed rectangle in the binarized detection frame (Step S73).

If the corresponding area in the binarized post-detection frame matches the corresponding area in the binarized detection frame, the draw-frame identifying process to be described below is performed (Step S74), and the circumscribed rectangle is excluded from the circumscribed rectangle extracted from the difference image (Step S75).

On the other hand, if the corresponding area in the binarized post-detection frame does not match the corresponding area in the binarized detection frame, or after the circumscribed rectangle has been excluded, the processes with respect to the next circumscribed rectangle or the next detection frame are performed.

Figure 18:
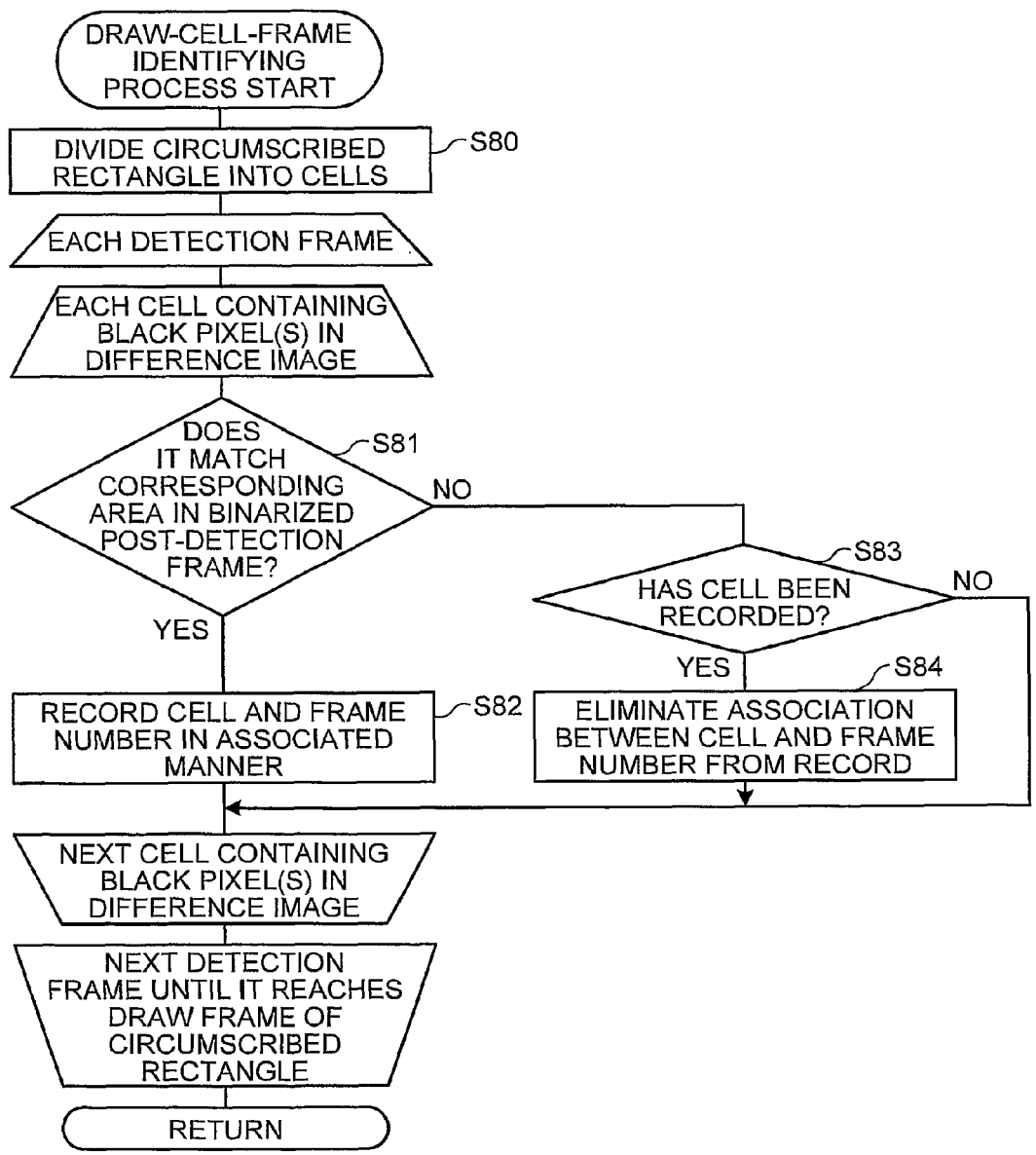
FIG. 18 is a conceptual diagram for explaining an operation of the video editing device according to the fourth embodiment.

As shown in FIG. 18, in the draw-frame identifying process, first, the draw-frame identifying unit 21 divides the circumscribed rectangle into a plurality of cells (Step S80).

Steps S81 to S84 to be explained below are performed on each of the detection frames up to a previous frame of a draw frame on which the circumscribed rectangle is drawn (a frame matching the circumscribed rectangle) for each cell containing black pixel(s) in the difference image.

First, the draw-frame identifying unit 21 determines whether an area corresponding to the cell in the binarized post-detection frame matches an area corresponding to the cell in the binarized detection frame (Step S81).

If the corresponding area in the binarized post-detection frame matches the corresponding area in the binarized detection frame, the draw-frame identifying unit 21 records a frame number of the detection frame and the cell on a recording medium such as a RAM in an associated manner (if it is not recorded) (Step S82), and the processes with respect to the next cell or the next detection frame are performed.

On the other hand, if the corresponding area in the binarized post-detection frame does not match the corresponding area in the binarized detection frame, the draw-frame identifying unit 21 determines whether a frame number of the detection frame and the cell are recorded on the recording medium in an associated manner (Step S83).

If it is determined that the cell is recorded on the recording medium in association with a frame number of the detection frame, the association between the frame number of the detection frame and the cell is eliminated from the recording medium (Step S84).

On the other hand, if it is determined that the cell is not recorded on the recording medium in association with a frame number of the detection frame, or after the association between the frame number of the detection frame and the cell has been eliminated from the recording medium, the processes with respect to the next cell or the next detection frame are performed.

Figure 19:
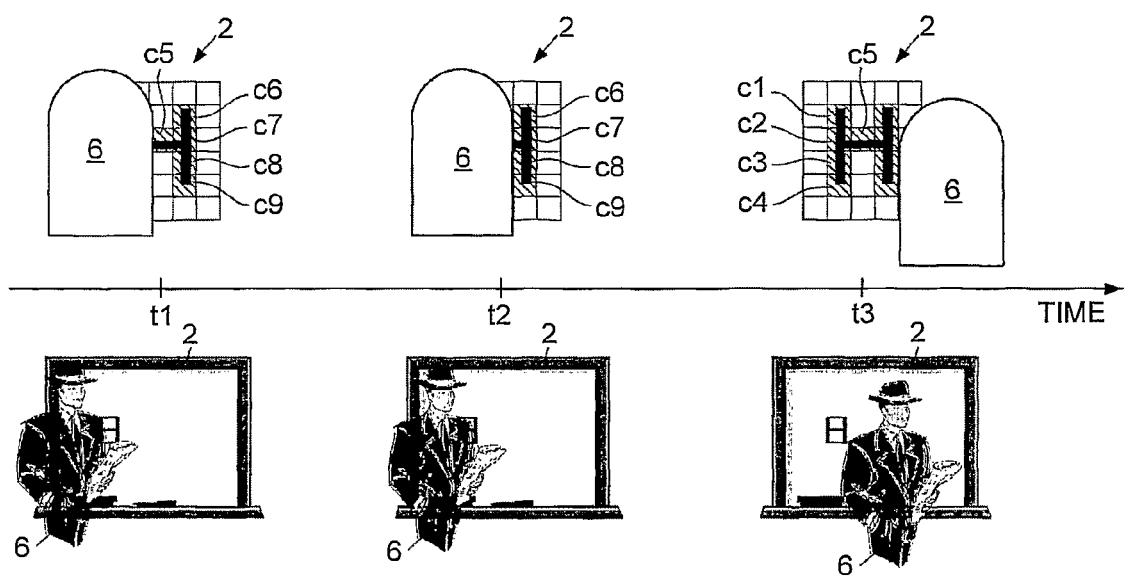
FIG. 19 is a conceptual diagram for explaining the operation of the video editing device according to the fourth embodiment.

For example, as shown in FIG. 19 in which the whiteboard 2 is illustrated on the lower part and a portion of the enlarged whiteboard 2 is illustrated on the upper part, when writing of "H" is detected in a frame at a time t3 through the operation of the video editing device 4 as described above, writing on cells c5 to c9 is detected in a frame at a time t1, and the writing on the cells c5 to c9 in the frame at the time t1 is recorded.

Then, when the writing on the cell c5 is not detected in a frame at a time t2 in accordance with the movement of the moving body 6, the writing on the cell c5 in the frame at the time t1 is eliminated from the record. The moving body 6 further moves, and the writing on the cells c5 to c9 is detected in the frame at the time t3, and then the writing on the cells c5 to c9 in the frame at the time t3 is recorded.

Therefore, the cells c6 to c9 are synthesized based on the frame at the time t1, and the cells c1 to c5 are synthesized based on the frame at the time t3.

As explained above, the video editing system 1 according to the fourth embodiment of the present invention can detect a time when drawing of image information is started at a high speed by comparing frames in units of a rectangle, and can detect the time when the drawing of image information is started with high accuracy by comparing the frames in units of cells of a relatively-small size.

Incidentally, as described above, the draw-frame identifying process in the present embodiment is a process made up of a combination of the draw-frame identifying process in the first embodiment of the present invention and the draw-frame identifying process in the third embodiment of the present invention.

Likewise, in the present invention, a process made up of a combination of the draw-frame identifying process in the second embodiment of the present invention and the draw-frame identifying process in the third embodiment of the present invention can be used.

The invention claimed is:

1. A video editing device that edits a video of an object on which image information is drawn, the video editing device comprising:
   a moving-body-frame detecting unit that detects a frame on which a moving body obstructing the object is captured;
   a draw-frame identifying unit that compares a post-detection frame, on which the moving body is no longer detected by the moving-body-frame detecting unit, with each particular detection frame that is anterior to the post-detection frame and in which the moving body is detected by the moving-body-frame detecting unit to thereby identify a first frame in which the image information is drawn from among the particular detection frames, and that identifies an area of the drawn image information in the video; and
   a synthesis processing unit that sequentially replaces each of the particular detection frames with a frame anterior to the respective particular detection frame, and synthesizes image information included in the post-detection frame corresponding to the identified area of the drawn image information in the video onto a corresponding area of the respective particular detection frame when the respective particular detection frame is the first frame identified by the draw-frame identifying unit.

2. The video editing device according to claim 1, wherein the moving-body-frame detecting unit detects the frame on which the moving body obstructing the object is captured based on a change in an area circumscribed by at least one side of the object in the video, the at least one side of the object in the video including a base of the object.

3. The video editing device according to claim 1, wherein the moving-body-frame detecting unit detects the frame on which the moving body obstructing the object is captured based on whether a sum of lengths of motion vectors in the video exceeds a predetermined threshold.

4. The video editing device according to claim 1, wherein the moving-body-frame detecting unit is composed of a switch that is switched over between before and after the moving body obstructs the object.

5. The video editing device according to claim 1, wherein the draw-frame identifying unit compares the post-detection frame with each particular detection frame in units of rectangles.

6. The video editing device according to claim 5, wherein the draw-frame identifying unit
   generates a difference image between a pre-detection frame that is a frame before the a frame is detected by the moving-body-frame detecting unit and the post-detection frame,
   extracts a circumscribed rectangle of a connected component of pixels having a brightness of a certain value or less from the difference image that is generated, and
   compares the post-detection frame with each particular detection frame in units of the circumscribed rectangles that are extracted.

7. The video editing device according to claim 5, wherein the draw-frame identifying unit
   generates a difference image between an anterior-detection frame that is a frame before a frame is detected by the moving-body-frame detecting unit and the post-detection frame,
   divides the difference image that is generated into cells of a predetermined size, and
   compares the post-detection frame with each particular detection frame in units of cells overlapping a difference area out of the cells that are divided.

8. The video editing device according to claim 5, wherein the draw-frame identifying unit
   performs a template matching on each of the particular detection frames with each rectangle of the post-detection frame that is set as a template, and
   identifies a most anterior frame, in which a rectangle of which the result of template matching exceeds a predetermined threshold exists in a same area or a surrounding area, as a draw-frame on which the rectangle is used as the template.

9. The video editing device according to claim 5, wherein the draw-frame identifying unit, after identifying a draw-frame by the rectangle, compares each of pixels included in the rectangle of the draw-frame that is identified with a corresponding pixel located at a same position in each of the particular detection frames, and identifies a most anterior frame, out of particular detection frames in which pixels having a degree of coincidence exceeding a predetermined threshold and continuously being present up to the frame on which the rectangle is drawn, as a frame on which the pixel is drawn.

10. The video editing device according to claim 1, wherein the draw-frame identifying unit compares the post-detection frame with each particular detection frame in units of pixels.

11. The video editing device according to claim 10, wherein the draw-frame identifying unit generates a difference image between an anterior-detection frame that is a frame before the a frame is detected by the moving-body-frame detecting unit and the post-detection frame, and compares the post-detection frame with each particular detection frame for each pixel included in the difference image generated.

12. The video editing device according to claim 10, wherein the draw-frame identifying unit compares each of pixels included in the post-detection frame with a corresponding pixel located at a same position in each of the particular detection frames, and identifies a most anterior frame, out of particular detection frames in which pixels having a degree of coincidence exceeding a predetermined threshold and continuously being present up to the post-detection frame as a frame on which the pixel is drawn.

13. The video editing device according to claim 1, wherein the synthesis processing unit performs the synthesizing after brightness of frames detected by the moving-body-frame detecting unit is averaged.

14. The video editing device according to claim 1, further comprising:

a filtering unit that adds, with respect to each pixel composing each frame of a video to be edited, a certain predetermined background color to a difference value between an average value of the brightness of a predetermined area centering around the pixel and the brightness of the pixel that is centered around.

15. A video editing system comprising:

an object on which image information is drawn;

a video shooting device that shoots the object; and a video editing device that edits a video shot by the video shooting device, the video editing device including:

a moving-body-frame detecting unit that detects a frame on which a moving body obstructing the object is captured, a draw-frame identifying unit that compares a post-detection frame, on which the moving body is no longer detected by the moving-body-frame detecting unit, with each particular detection frame that is anterior to the post-detection frame and in which the moving body is detected by the moving-body-frame detecting unit to thereby identify a first frame in which the image information is drawn from among the particular detection frames, and that identifies an area of the drawn image information in the video, and a synthesis processing unit that sequentially replaces each of the particular detection frames with a frame anterior to the respective particular detection frame, and synthesizes image information included in the post-detection frame corresponding to the identified area of the drawn image information in the video onto a corresponding area of the respective particular detection frame when the respective particular detection frame is the first frame identified by the draw-frame identifying unit.

* * * * *